Feb. 22, 1966   K. STEISSLINGER ETAL   3,236,166
DEPTH-OF-FIELD INDICATOR FOR CAMERAS
Filed Oct. 18, 1962   2 Sheets-Sheet 1

KURT STEISSLINGER
ERNST LIESER
INVENTORS

BY R. Frank Smith
Lloyd F. Seebach
ATTORNEY & AGENT

Feb. 22, 1966 K. STEISSLINGER ETAL 3,236,166
DEPTH-OF-FIELD INDICATOR FOR CAMERAS
Filed Oct. 18, 1962 2 Sheets-Sheet 2

KURT STEISSLINGER
ERNST LIESER
INVENTORS

BY R. Frank Smith
Lloyd F. Sutrich
ATTORNEY & AGENT

United States Patent Office 3,236,166
Patented Feb. 22, 1966

3,236,166
DEPTH-OF-FIELD INDICATOR FOR CAMERAS
Kurt Steisslinger, Stuttgart-Hedelfingen, and Ernst Lieser, Stuttgart-Vaihingen, Germany, assignors to Eastman Kodak Company, Rochester, N.Y., a corporation of New Jersey
Filed Oct. 18, 1962, Ser. No. 231,433
1 Claim. (Cl. 95—10)

The invention relates to a photographic camera, and more particularly to a depth-of-field indicator for a camera having a focusing lens system and a photoelectric exposure control system, with the depth of field of the lens system being indicated as a function of scene brightness and scene or object distance.

Depth-of-field indicators are well-known in cameras wherein a manually operable diaphragm-setting ring is provided with spaced indicia and is moved or rotated to position the indicia relative to a distance or focus scale to indicate the depth of field for a selected diaphragm opening. In a camera having a photoelectric exposure control system, it is known to couple the movable coil of the exposure control system to a depth-of-field indicator that is moved relative to a distance scale. This is accomplished by moving the indicator elements in opposite directions by means of two coils that are energized by scene light or by a single coil that is interconnected to the indicator elements so as to move them in opposite directions. In either semi-automatic or fully-automatic photoelectric exposure control systems, the direct actuation of the depth-of-field indicator by means of the moving coil of the measuring instrument imposes an additional strain on the coil, which adversely affects the accuracy and response of the exposure control system.

The present invention overcomes the deficiencies of the prior art in that the depth-of-field indicator is not conncted directly to the moving coil of the measuring instrument but is controlled in accordance with the position thereof to obtain a setting of the indicator elements as a function of the scene brightness. When the invention is employed in a camera having a pointer-sensing type of photoelectric exposure control system, the distance scale is coupled to the focusing system and the indicator elements are coupled to, and movable in response to movement of, the pointer sensing means, the latter being employed to set one or more exposure regulating members in accordance with scene brightness. Accordingly, a final depth-of-field value is obtained that is a function of not only scene brightness but also of scene or object distance. Since the indicator elements are coupled to the pointer sensing means, the depth-of-field indicator can be incorporated in the viewfinder, thereby presenting the depth of field to the operator before the shutter is released.

It is the primary object of the invention, therefore, to provide a camera having a focusing lens system and an automatic exposure control system with a depth-of-field indicator that indicates the depth of field as a function of both scene brightness and scene or object distance.

Another object of the invention is to provide a camera having a focusing lens system and an automatic exposure control system with a depth-of-field indicator that includes a distance scale movable as a function of scene or object distance and indicator elements that are movable in opposite directions and relative to the distance scale as a function of scene brightness.

And yet another object of the invention is to provide a camera having a focusing lens system and an automatic exposure control system with a depth-of-field indicator that can be easily arranged in the focal plane of a reflex viewfinder so as to indicate the depth of field to the operator before the camera shutter is released.

These and other objects and advantages will be apparent to those skilled in the art by the embodiments of the invention disclosed and described herein.

Reference is now made to the accompanying drawings wherein like reference numerals designate like parts and wherein.

Figure 1:
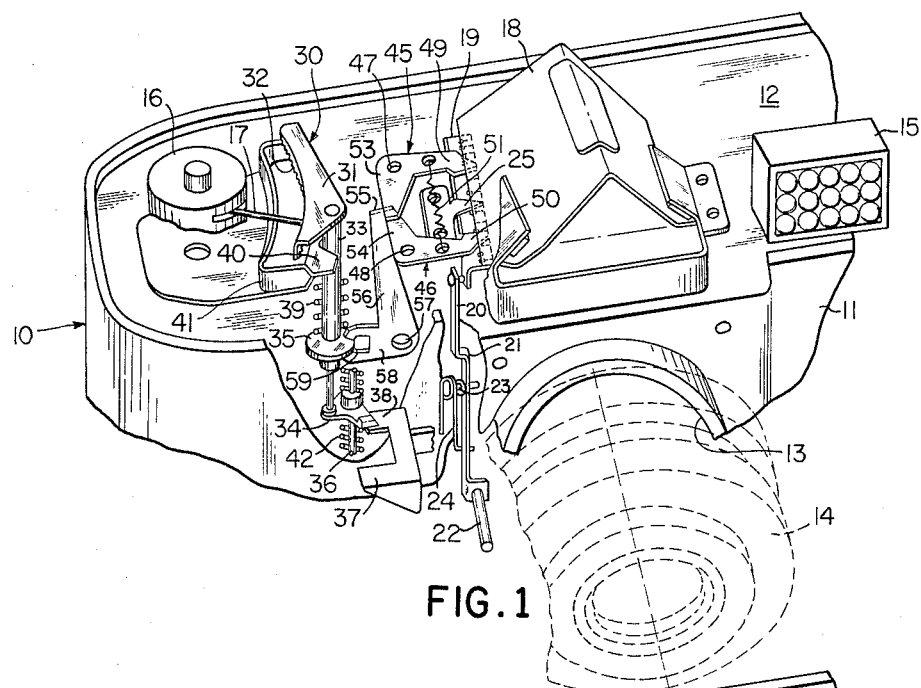
FIG. 1 is a perspective view of a camera showing one embodiment of the invention with certain parts of the camera being omitted to more clearly disclose the invention.
Figure 3:
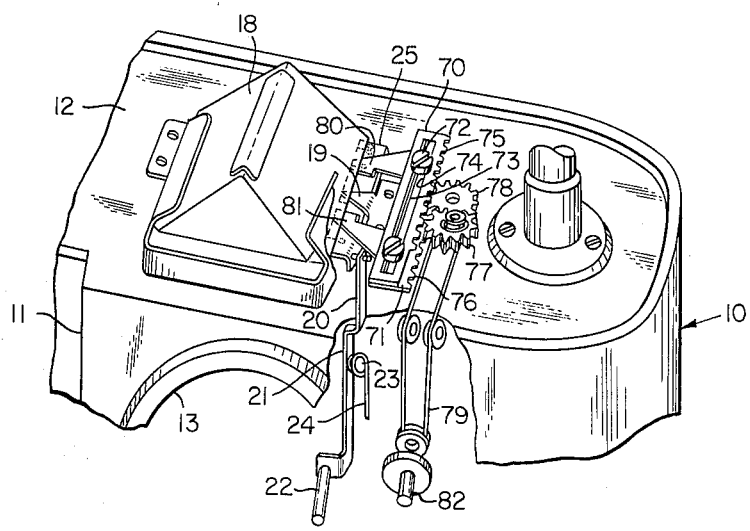
Figure 4:
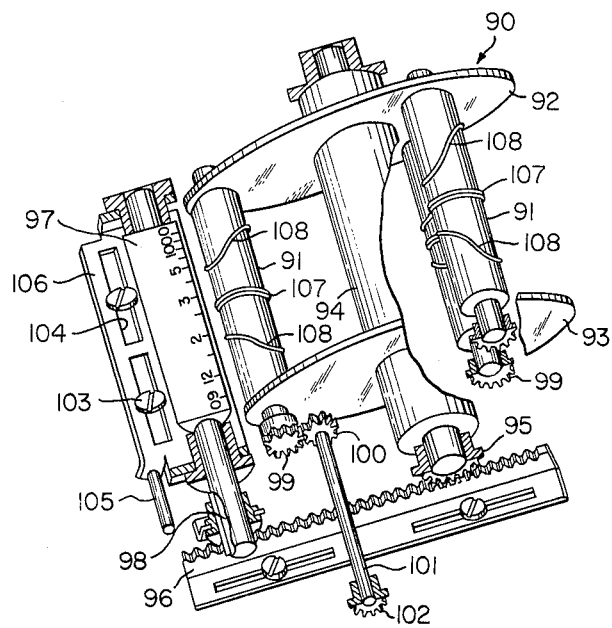

FIG. 3 is a perspective view of the camera which is similar to FIG. 1 showing still another embodiment of the invention and particularly another form of indicator element and arrangement for coupling the elements to the automatic exposure control system; and FIG. 4 is a perspective view showing a set of scales and indicating members for a depth-of-field indicator that can be used in conjunction with a camera receptive to interchangeable focusing lens systems.

With particular reference to FIG. 1, the camera 10 comprises a casing 11 having an extending top surface 12 on which various elements of the camera are mounted. The front wall of the camera is provided with an opening 13 into which and over which a focusing lens system designated broadly by the numeral 14 is mounted in a well-known manner. Such a focusing lens system can be of the type shown in U.S. Patent 2,313,567, which is provided at the rear end thereof with a cam surface for a purpose to be described hereinafter. Camera 10 also includes an automatic exposure control system comprising a photocell 15 that is connected electrically to the measuring instrument 16 having an output member comprising a pointer or an arm 17 as shown in FIG. 1. Measuring instrument 16 can be of the galvanometer type in which the arm 17 is moved or positioned by a movable coil energized by the scene light incident on photocell 15, the movement of arm 17 being a function of the scene light. The camera 10 also has incorporated therein a reflex viewfinder designated generally by the numeral 18. Such a viewfinder is well-known in the art and forms no part of the present invention with the exception that the depth-of-field indicator scale and indicator elements lie in the focal plane of such finder which can be substantially in the same plane as that of the top 12.

A calibrated distance scale 19 is slidably mounted on top 12 and at one end thereof is pivotally connected to the end 20 of lever 21. Lever 21 is pivotally mounted on the casing 11 intermediate its ends and is provided at the end opposite end 20 with an extending pin 22. Lever 21 is pivotally mounted on the casing 11 at 23 and is biased or urged in a counterclockwise direction by the spring 24 so as to hold the pin 22 against the cam at the rear end of the focusing lens system 14. It can be readily appreciated that as the focusing lens system is turned to adjust the lens system for the correct scene or object distance, the pin 22 will be moved in substantially an axial direction relative to that of the optical axis so as to move the distance scale 19 a corresponding amount. The distance scale 19 is thereby moved relative to a fixed index member 25 that is secured to the top 12 of camera casing 11. By this arrangement, the distance scale 19 is adjusted relative to index 25 as a function of the scene or object distance.

As is well-known in the art, the exposure value or values can be established by sensing the position of the output member or arm 17 of measuring instrument 16. In U.S. Patent 3,016,811, an automatic exposure control system for cameras is disclosed in which movement of the release member causes a sensing member to be moved against the arm of the movable coil so as to adjust the diaphragm opening as a function of scene brightness. A similar exposure control system can be utilized in the camera of the present invention and need not necessarily be limited to setting of the diaphragm opening but can also be dependent on the setting of the shutter speed or a combination of the diaphragm opening and shutter speed. Accordingly, the use of the expression "Exposure Value" can be meant to include either setting of the diaphragm opening, setting of the shutter speed, or a combination of setting the shutter speed and the exposure opening. In the present invention, the exposure regulating device in generally indicated by the numeral 30. This device comprises a sensing member 31 having a vertical extending portion 32 that is provided with a series of steps, as is well-known in the art, for engaging the arm 17 in accordance with its position as a function of scene light. Member 31 is secured to the upper end of the vertically extending rod 33 that is secured at its other end to an actuating member 34. Intermediate its ends, the vertical member 33 is provided with a flange 35 for a purpose to be described hereinafter. The actuating member 34 is movable along a vertical shaft 36 in an upward direction by the manually operable release member 37, as said release member returns to its normal position as described hereinafter. The release member 37 can be coupled to the diaphragm blades in a manner as shown in U.S. Patent 3,016,811, and upon movement in a downward direction also serves to release the shutter at the end of its downward movement. Member 37 is provided with an extension 38 that engages the underside of actuating member 34 and the spring (not shown) that holds member 37 in its normal position is stronger than spring 39 that is arranged around the member 33 between the flange 35 and the abutment 40 on the frame 41, whereby sensing member 30 is held in a position above arm 17. Another spring 42 surrounds shaft 36 and counteracts the action of the spring 39 to urge actuating member 34 in a downward direction.

Indicator members 45 and 46 are in the form of bell crank levers which are pivotally mounted at 47 and 48, respectively, on the top 12 of casing 11. The indicator arms 49 and 50 are interconnected by the spring 51 and extend over the distance scale 19, as shown in FIG. 1, the arms being arranged on opposite sides of the fixed index 25 and being movable in opposite directions relative thereto. The arms 53 and 54 are arranged so as to overlap at their ends and at this point are engaged by the end 55 of the bell crank lever 56 that is pivotally mounted on the casing 11 at 57, the other arm 58 of lever 56 being provided with a bifurcated end 59 that engages the flnage 35.

As is well-known, a reflex viewfinder which has a pentaprism in the system usually has its focal plane at a point below the prism. In this particular instance, the distance scale 19, the fixed index 25, and the indicator arms 49 and 50 are arranged so as to be in the focal plane and positioned therein so as to be visible to the operator when the scene being viewed in the finder is transmitted through the finder system. As a result, the operator can continually view the change in the depth-of-field indication as the manual release member 37 is moved downward, whereby the position of arm 17 is sensed so as to establish an exposure value and before the shutter is actually released.

In operation, the lens focusing system is first set by the operator to the proper scene or object distance. With this rotation of the lens system, the cam at the rear end of the system is rotated against pin 22 to cause lever 21 to move either in a clockwise or counterclockwise direction, dependent on the direction of movement of the focusing system. As this is accomplished, the end 20 of lever 21 that is connected to the distance scale 19 causes said scale to move relative to the fixed index 25 to establish the scale in a position with respect to the index 25 as a function of scene or object distance.

The camera can then be pointed by the operator toward the scene which is viewed through the finder 18 for composition. The light from the scene incident on the photocell 15 causes the measuring instrument 16 to deflect the arm 17 thereof over the edge of the frame 41 to a position that is a function of the scene brightness. The manually operable release means is then moved in a downward direction by the operator. The first portion of this downward movement causes the extension 38 to move away from the actuating member 34; however, due to the force of spring 39 which acts against flange 35, the sensing member 31 with the step surface 32 follows release member 37. This movement of sensing member 31 is arrested by the engagement of the step edge 32 with the arm 17 of measuring instrument 16. The corresponding downward movement of flange 35 causes the lever 56 to pivot in a counterclockwise direction, the spring 51 causing the arms 53 and 54 to follow end 55, whereby the indicator arms 49 and 50 are moved toward one another and relative to the distance scale 19. The amount of movement of arms 49 and 50 will be determined by the position assumed by the end 55 of lever 56 with the engagement of arm 17 by the steps 32, the vertical movement of the sensing member 30 also being arrested so the correct depth of field is then indicated by arms 49 and 50 with respect to distance scale 19 as a function of both scene brightness and scene or object distance. Sensing member 31 is held against arm 17 by virtue of spring 39 as release member 37 continues its downward movement. At the same time, through the actuation of the diaphragm blades by manually operable release member 37, the diaphragm opening is established as a function of the scene brightness and further movement of release member 37 then serves to actuate the shutter. Upon release of member 37 by the operator, the spring associated therewith returns it to its initial position and upon engagement of member 34 by extension 38, the sensing device 30 returns to its normal position above the arm 17 against the action of spring 39. With this movement, the indicator arms 49 and 50 are permitted to assume their normal position relative to the fixed index 25 due to the counterclockwise movement of lever 56 which counteracts the force of spring 51. As pointed out hereinabove, the downward movement of release member 37 can be utilized to set the shutter speed as well as the diaphragm opening, so that the exposure control system in this case would be fully automatic.

Figure 2:
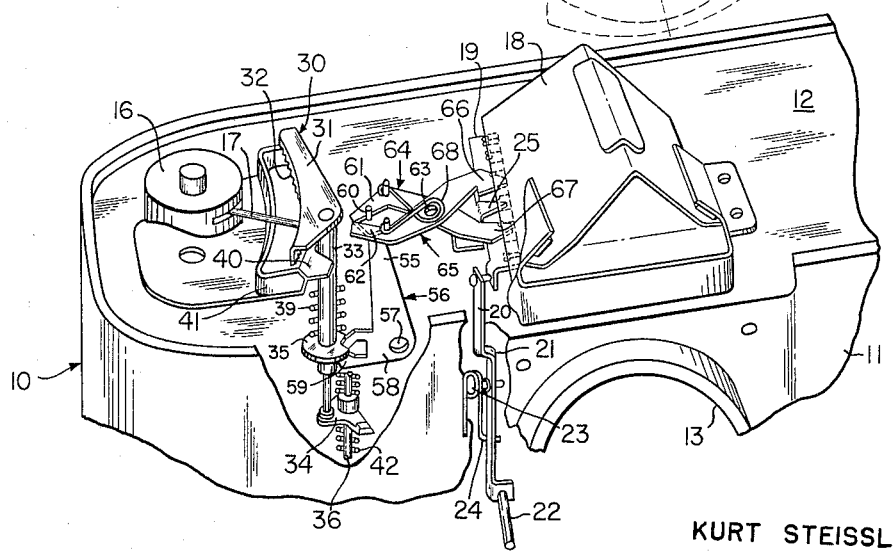
FIG. 2 is a perspective view of a camera similar to that shown in FIG. 1 wherein another embodiment of the invention is disclosed, particularly another form of the indicator elements.

With reference to FIG. 2 in which another embodiment of the invention is disclosed, this embodiment differs from that just described only in the arrangement of the indicator arms. As shown in FIG. 2, the end 55 of lever 56 carries a pin 60 that engages the inner surfaces of the ends 61 and 62 of levers 64 and 65 that are pivotally mounted about the same pivot point 63 on top 12. The indicator arms 66 and 67 are movable toward and away from each other by the engagement of pin 60 with the ends 64 and 65 and are urged into engagement with pin 60 and into their normal positions by the spring 68.

The operation of the depth-of-field indicator, as shown in FIG. 2, is substantially the same as that described with respect to FIG. 1; that is, lever 56 is moved in a counterclockwise direction as the sensing device 30 is moved in a downward direction. This movement causes the pin 60 on the end 55 of lever 56 to engage the surfaces of ends 61 and 62 so as to move the indicator arms 66 and 67 relative to the distance scale 19 and toward the fixed index 25 against the action of spring 68. Aside from this difference in the operation of levers 64 and 65, the function and operation is the same as that described with respect to FIG. 1.

In FIG. 3 another embodiment for moving the indicator arms relative to scale 19 and index 25 is disclosed. In this particular embodiment, the arms 80 and 81 are formed as extensions from plates 70 and 71, respectively, which are slidably mounted on top 12 by means of the screws 72 passing through the slots 73 and 74 in their respective members. Each of plates 70 and 71 is provided along an edge thereof with a rack portion 75 and 76, respectively. A pair of intermeshing gears 77 and 78 are arranged in offset relation relative to the rack portion 75 and 76 so that the gear 77 engages rack portion 76 and the gear 78 engages the rack portion 75. Gear 77 has integral therewith, on the under side, a pulley not shown which is connected by the cable 79 to the shaft 82 that is rotatable with setting of the diaphragm opening. The embodiment for moving the indicator members 80 and 81 just described is particularly adapted to a ring-type diaphragm; that is, one in which the diaphragm is set by rotation of a setting member. Such rotation can be accomplished, as is well-known, with sensing of the output member or arm 17 of the measuring device 16. The rotation of the diaphragm-setting member is then transmitted to shaft 82 which by means of cable 79 rotates the gear 77 as well as the meshing gear 78, the gears being rotated in opposite directions and thereby imparting movement to the indicator arms 80 and 81, which movement will also be in opposite directions as well as relative to the scale 25.

A form of the invention is disclosed in FIG. 4 which is particularly adaptable to a camera that is receptive to interchangeable lenses. In a camera of this type, a turret generally indicated by the numeral 90 contains a number of cylindrical members 91 that are equiangularly spaced between the plates 92 and 93. The plates 92 and 93 are mounted on a shaft 94 that is journaled in suitable bearings and has a gear 95 at one end thereof which engages a rack 96. The rack 96 can be moved in either direction by a device on the outside of the camera casing that indicates the proper scale and member that are to be positioned relative to each other in accordance with the lens on the camera. The scale member, generally designated by the numeral 97, is polygonal in shape and comprises a number of scales in accordance with the number of members 91 and each scale is graduated in accordance with the lens representative thereof. As a result, when the turret 90 is rotated by means of rack 96 and pinion 95, this same movement of the rack rotates the scale member 97 by means of the slide gear 98 on one end thereof to position the proper scale opposite the member 91. When this is accomplished, the gear 99 that is on the end of each of members 91 will be brought into meshing engagement with a gear 100 that is connected by shaft 101 to a gear 102 which, in turn, is rotated upon setting of the diaphragm opening or the shutter speed or a combination of both. The scale member 97 is slidably mounted with respect to the members 91 by means of screws 103 engaging suitable slots 104 in the bracket 106 supporting the scale member 97. This bracket is provided with a pin 105 that engages the focusing lens systems, as described above, to position the scale member as a function of the scene or object distance.

Each of members 91 is provided with a ridge 107 (fixed index number) that is centrally located with respect to the axial length of members 91 as well as spaced helical ridges 108 that indicate the depth of field and can be considered equivalent to the indicator arms described hereinbefore. These ridges 108 are of opposite hand and extend in a helical pattern around the periphery of the member 91. Each of the indicating members 108 is positioned relative to the index ridge 107 in accordance with the focal length of the lens with which it is to be used and indicate the depth of field by the portion immediately adjacent scale 97.

In operation, therefore, when the operator has positioned a lens on the front of the camera, a suitable knob or fingerpiece is moved to direct the rack 96 in the proper direction. This movement will cause the turret 90 to be rotated as well as the scale member 97 so as to position the member 91 and the scale member 97 corresponding to the lens in relation to each other as shown in FIG. 4. With focusing of the lens, the pin 105, which engages the cam surface on the lens mount, causes the scale 97 to be moved in an axial direction to position it as a function of scene or object distance. When the manually operable release member 37 is moved downwardly to sense the position of the arm 17, the diaphragm setting ring is rotated and this movement is transmitted to gear 102 which, in turn, rotates gear 100 and gear 99 so as to rotate member 91, thereby positioning ridges 108 relative to the scale 97 as a function of scene brightness.

In each of the embodiments described hereinabove, it can be readily appreciated that in each instance the scale member is moved relative to a fixed index as a function of scene or object distance. Also, the indicator arms for showing the depth of field permissible under a set exposure value and scene or object distance is accomplished by moving the indicator arms over the scale and relative to the fixed index. It will be obvious to those skilled in the art that various modifications other than those shown and described herein can be made without departing from the spirit of the invention; however, the scope of the invention is not to be limited to the embodiments disclosed but is of a scope as defined by the appended claim.

We claim:

In a camera having a taking-lens system including adjustable focusing means, an exposure meter energizable by scene light, said meter having an output member positionable as a function of the energization of said meter; a depth-of-field indicating device comprising in combination:

an index member;
a scale member coupled to said focusing means and movable thereby relative to said index member as a function of object distance;
an exposure control system including at least one exposure regulating device and means adapted to be moved under manual control, into engagement with said ouput member for sensing the position thereof, said sensing means being coupled to said regulating device to adjust the latter as a function of said scene brightness; and
means movable relative to said scale member comprising two pivotally mounted bell crank members, each of said bell crank members having an indicating arm and an actuating arm, resilient means for moving said indicating arms toward each other, and a pivotally mounted control member having one arm in engagement with said sensing means and another arm in engagement with said actuating arms, said control member normally maintaining each of said indicating arms in a predetermined spaced relation with respect to said index member and being responsive to movement of said sensing means for moving said indicating arms away from each other and relative to said scale member to indicate the depth of field as related functions of scene brightness and object distance.

References Cited by the Examiner

UNITED STATES PATENTS

| | | | |
|---|---|---|---|
| 2,879,702 | 3/1959 | Gossen | 95—10 |
| 2,917,983 | 12/1959 | Gebele | 95—64 |
| 2,978,970 | 4/1961 | Fahlenberg | 95—10 |
| 3,016,811 | 1/1962 | Bundschuh | 95—10 |

(Other references on following page)

UNITED STATES PATENTS

| | | | |
|---|---|---|---|
| 3,046,858 | 7/1962 | Steisslinger | 95—10 |
| 3,065,682 | 11/1962 | Rentschler | 95—10 |
| 3,073,225 | 1/1963 | Wiessner | 95—10 |
| 3,126,800 | 3/1964 | Maas | 95—10 |

FOREIGN PATENTS 1,267,643  6/1961  France.

NORTON ANSHER, *Primary Examiner.*

D. B. LOWE, EMIL ANDERSON, *Examiners.*